(12) United States Patent
Ohtake et al.

(10) Patent No.: US 10,844,258 B2
(45) Date of Patent: Nov. 24, 2020

(54) METAL DOPED CERIUM OXIDE COMPOSITIONS

(71) Applicant: RHODIA OPERATIONS, Paris (FR)

(72) Inventors: Naotaka Ohtake, Tokushima (JP);
Manabu Yuasa, Tokushima (JP);
Toshihiro Sasaki, Tokushima (JP);
Eisaku Suda, Tokushima (JP);
Lauriane Dalencon,
Issy-les-Moulineaux (FR)

(73) Assignee: RHODIA OPERATIONS,
Aubervilliers (FR)

( * ) Notice: Subject to any disclaimer, the term of this patent is extended or adjusted under 35 U.S.C. 154(b) by 0 days.

(21) Appl. No.: 15/321,360

(22) PCT Filed: Jun. 24, 2015

(86) PCT No.: PCT/EP2015/064177
§ 371 (c)(1),
(2) Date: Dec. 22, 2016

(87) PCT Pub. No.: WO2015/197656
PCT Pub. Date: Dec. 30, 2015

(65) Prior Publication Data
US 2017/0152421 A1    Jun. 1, 2017

(30) Foreign Application Priority Data

Jun. 24, 2014  (EP) ................................. 14290182

(51) Int. Cl.
| | |
|---|---|
| *C09G 1/02* | (2006.01) |
| *C09K 3/14* | (2006.01) |
| *B01D 53/94* | (2006.01) |
| *B01J 35/10* | (2006.01) |
| *B01J 37/03* | (2006.01) |
| *B01J 23/10* | (2006.01) |
| *C01G 25/00* | (2006.01) |
| *B01J 35/00* | (2006.01) |
| *C01F 17/206* | (2020.01) |
| *B01J 37/04* | (2006.01) |
| *B01J 37/06* | (2006.01) |
| *B01J 37/08* | (2006.01) |

(52) U.S. Cl.
CPC .......... *C09K 3/1409* (2013.01); *B01D 53/944* (2013.01); *B01J 23/10* (2013.01); *B01J 35/002* (2013.01); *B01J 35/0013* (2013.01); *B01J 35/1014* (2013.01); *B01J 37/031* (2013.01); *B01J 37/04* (2013.01); *B01J 37/06* (2013.01); *B01J 37/08* (2013.01); *C01F 17/206* (2020.01); *C01G 25/006* (2013.01); *C09G 1/02* (2013.01); *C09K 3/1436* (2013.01); *C09K 3/1454* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/40* (2013.01); *B01D 2255/407* (2013.01); *B01D 2255/908* (2013.01); *C01P 2002/60* (2013.01); *C01P 2004/45* (2013.01); *C01P 2006/13* (2013.01)

(58) Field of Classification Search
CPC .............. C01P 2004/03; C01P 2004/50; C01P 2004/52; C01P 2004/62; C01P 2004/64; C01P 2004/06; C01P 2004/12; C01P 2004/22
See application file for complete search history.

(56) References Cited

U.S. PATENT DOCUMENTS

| | | | | |
|---|---|---|---|---|
| 4,786,325 A | * | 11/1988 | Melard ................ | C09K 3/1454 106/3 |
| 6,706,082 B2 | * | 3/2004 | Ota ....................... | B82Y 30/00 106/3 |
| 2009/0215614 A1 | * | 8/2009 | Chane-Ching ....... | B01J 13/0013 502/304 |
| 2010/0111789 A1 | | 5/2010 | Fajardie et al. | |
| 2011/0225897 A1 | * | 9/2011 | Criniere ................ | B82Y 30/00 51/309 |
| 2013/0210617 A1 | | 8/2013 | Hernandez et al. | |

FOREIGN PATENT DOCUMENTS

| | | |
|---|---|---|
| EP | 1055642 A2 | 10/2000 |
| EP | 1219568 A2 | 7/2002 |

* cited by examiner

*Primary Examiner* — Noah S Wiese

(57) ABSTRACT

The present invention concerns a process for the production of metal doped cerium compositions comprising a cerium oxide and a metal oxide by precipitation. The invention also concerns metal doped cerium compositions providing high crystallites size and exhibiting high thermal stabilities, which may be used as a catalytic support or for polishing applications.

22 Claims, No Drawings

METAL DOPED CERIUM OXIDE COMPOSITIONS

CROSS-REFERENCE TO RELATED APPLICATIONS

The present application is a U.S. national phase entry under 35 U.S.C. § 371 of International Application No. PCT/EP2015/064177, filed on 24 Jun. 2015, which claims priority to European application No. 14290182.6, filed on 24 Jun. 2014, the entire content of these applications being incorporated herein by reference for all purposes.

The present invention concerns a process for the production of metal doped cerium compositions comprising a cerium oxide and a metal oxide by precipitation. The invention also concerns metal doped cerium compositions providing high crystallites size and exhibiting high thermal stabilities, which may be used as a catalytic support or for polishing applications.

PRIOR ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Ceric oxides are commonly used as a catalyst or catalyst support and for polishing applications as well. Regarding the catalysis application, it is well known that the effectiveness of a catalyst generally increases as the contact area between the catalyst and the reactants increases. In order to achieve this, it is necessary that the catalyst be kept in a state which is as finely divided as possible, that is to say that the solid particles which constitute it are as small and as individualized as possible. The fundamental role of the support is therefore to keep the catalyst particles or crystallites in contact with the reactant, in the most finely divided state possible. Regarding polishing application, the development of the electronics industry requires an increasingly considerable use of compositions for polishing various parts such as discs or dielectric compounds. These compositions are in the form of suspensions and they must correspond to a certain number of characteristics. For example, they must offer a high degree of removal of material, which reflects their abrasive capacity. They must also have a defectuosity which is as low as possible; the term "defectuosity" is intended to mean in particular the amount of scratches exhibited by the substrate once treated with the composition. For reasons of stability and of ease of use, these suspensions must consist of particles of submicronic dimension, i.e. generally less than 300 nm. In addition, the presence of particles that are too fine in these suspensions reduces their abrasive capacities, and particles that are too large can contribute to an increase in the defectuosity.

Doping cerium with various elements is also known for these applications for several purposes, such as for its oxygen ion conduction which is thought to be interest to improve oxygen storage capacity on specific catalysis applications, notably CSF (Catalyzed Soot Filter) and DOC (Diesel Oxidation Catalyst), and also to improve the polishing rate and surface finishing, notably for chemical-mechanical polishing.

However, it appears that doping cerium will lead to a drastic decrease of the specific surface area of these compounds over time and temperature, showing then a low thermal stability. It is thus understood that the development of cerium mixed oxides able to reach sufficient properties in various applications such as in catalysis and polishing while maintaining a sufficient thermal stability is a complex problem.

INVENTION

The object of the invention is thus the development of a new process for preparing cerium-based mixed oxide compositions without the above identified disadvantages and having an important thermal stability, even higher than the pure cerium compounds. The present invention concerns then a process for the production of metal doped cerium compositions comprising a cerium oxide and a metal oxide by precipitation. The invention also concerns metal doped cerium compositions providing high crystallites size and exhibiting high thermal stabilities, which may be used as a catalytic support or for polishing applications. Compositions of the invention also provide a good NOx storage and reduction capability that may be used in various catalysis applications. Cerium-based mixed oxides of the invention having a good conservation of the specific surface area after thermal degradation also provide an effective oxygen storage capacity ("OSC") that is of interest for the treatment of exhaust gases of internal combustion engines.

The present invention concerns then a process for preparing a composition comprising a cerium oxide and at least a metal (M) oxide, said metal (M) oxide being not a cerium oxide, comprising the following steps:

(a) providing a solution comprising a cerium(III) salt, a cerium(IV) compound and at least a salt of metal (M); wherein cerium(III) salt/cerium(IV) compound molar ratio is comprised between 50/1 and 5000/1, (b) contacting this solution with a base, under an inert atmosphere, whereby a precipitate is obtained (c) subjecting the medium obtained in step (b) to a thermal treatment under an inert atmosphere, whereby the composition is obtained, wherein metal (M) oxide/cerium(IV) oxide molar ratio of said composition is comprised between 0.1 and 15%;

at least one of the steps (a), (b) or (c) being carried out in the presence of nitrate ions.

The process of the invention permits then to produce metal (M) doped cerium(IV) oxide compositions; ie. compositions containing one or more metal (M) dopant present in concentrations greater than would normally be present as impurities; wherein metal (M) oxide/cerium(IV) oxide molar ratio of said composition is comprised between 0.1 and 15%. Combinations of dopants are also considered.

The invention also concerns compositions susceptible to be obtained by this process.

Definitions

Other characteristics, details and advantages of the invention will become even more fully apparent on reading the description which will follow and concrete but non limiting examples intended to illustrate it.

Throughout the description, including the claims, the term "comprising one" should be understood as being synonymous with the term "comprising at least one", unless otherwise specified, and "between" should be understood as being inclusive of the limits. Therefore, it is specified that, in the continuation of the description, unless otherwise indicated, the values at the limits are included in the ranges of values which are given.

The expression "metal (M)" is understood to mean the elements from the group made up of alkali metal elements, alkaline earth metal elements, rare earth elements, actinide elements, transition metal elements and post transition metal elements, from the Periodic Table. The expression "rare earth" is understood to mean the elements from the group made up of yttrium and the elements from the Periodic Table with atomic numbers between 57 and 71 inclusive. Transition metal elements are defined as any element in the d-block of the Periodic Table, which includes groups 3 to 12 on the periodic table. Post transition metal elements, also known as poor metal, are defined as metallic elements in the p-block of the Periodic Table, notably aluminium, gallium, indium, thallium, tin, lead, bismuth and polonium.

A "metal (M) oxide" is a compound that comprises at least an oxygen atom and at least a metal (M). A "salt of metal (M)" is an ionic compound that comprises at least a metallic cation and an anion.

The contents are given as oxides unless otherwise indicated. The cerium oxide is in the form of ceric oxide (cerium(IV) oxide).

In the continuation of the description, the term "specific surface" is understood to mean the BET specific surface (SBET) determined by nitrogen adsorption in accordance with standard ASTM D 3663-78 laid down from the Brunauer-Emmett-Teller method described in the periodical "The Journal of the American Chemical Society, 60, 309 (1938)". Specific surface area (SBET) may be obtained as follows by using a MOUNTECH Co., LTD. Macsorb analyzer with a 200 mg sample which has been calcined beforehand at subjected temperature under air.

The calcinations, at the end of which the surface area values are given, are calcinations in air. Furthermore, the specific surface area values which are indicated for a given temperature and a given time correspond, unless otherwise indicated, to calcinations at a temperature held over the time indicated.

Percent of decrease ratio of specific surface area is obtained by measurement of specific surface area after calcination at 800° C. for 4 hours in comparison specific surface area after calcination at 300° C. for 4 hours, for an oxide composition. It corresponds to a change in its specific surface area according to the following formula:

decrease ratio (%)=(specific surface after calcination at 300° C./4 hours–specific surface after calcination at 800° C./4 hours)/specific surface after calcination at 300° C./4 hours×100.

For instance a mixed oxide exhibiting a specific surface area of 50 m²/g after calcination at 300° C. for 4 hours, and a specific surface area of 37 m²/g, after calcination at 800° C. for 4 hours, provides a decrease ratio of specific surface area of 26%.

DETAILS OF THE INVENTION

The first step (a) of the process above therefore consists in preparing a solution comprising at least a cerium(III) salt, a cerium(IV) compound and a salt of metal (M).

Solution of the present invention is defined as a liquid mixture in which the minor component is uniformly distributed within the major component.

As cerium(III) salts, use may be made of cerium(III) nitrate, chloride, sulfate, phosphate or carbonate, and also mixtures of these salts, such as mixed nitrates/chlorides. In the known manner, this starting solution should have the acidity suitable for the cerium to be entirely present in solution. The starting solution also comprises a cerium(IV) compound that may be a salt or an oxide. This can, for example, be cerium(IV) nitrate or cerium(IV) oxide. Wherein the medium comprises a cerium(IV) oxide, the solution of the invention then refers to a colloidal solution. A colloidal solution, sometimes known as a colloidal suspension, is a solution in which a material is evenly suspended in a liquid.

The amount of cerium(IV) compound is such that the cerium(III) salt/cerium(IV) compound molar ratio is comprised between 50/1 and 5000/1, preferably between 75/1 and 100/1, more preferably between 75/1 and 500/1, again more preferably between 100/1 and 500/1.

The solution also comprises a salt of metal (M) that may be for example a nitrate, chloride, sulfate, phosphate, acetate or carbonate. The solution of the invention may also comprise one or more salts of metal (M).

Salt of metal (M) may comprise a cationic metal (M), notably chosen in the group consisting of:
transition metal elements, such as Zr,
post transition metal elements, such as Al,
rare earth elements, such as La, Pr, Nd and Y, and
alkaline earth metal elements, such as Sr.

Salts of metal (M) are preferably chosen from the group consisting of: lanthanum nitrate, praseodymium nitrate, neodymium nitrate and zirconium nitrate.

The starting solution prepared in step (a) can be degassed beforehand by bubbling with an inert gas. The term "inert gas" or "inert atmosphere" is intended to mean, for the present description, an atmosphere or a gas free of oxygen, it being possible for the gas to be, for example, nitrogen or argon.

The second step (b) of the process consists in reacting the solution with a base. Products of the hydroxide type can in particular be used as base. Mention may be made of alkali metal or alkaline earth metal hydroxides and aqueous ammonia. Secondary, tertiary or quaternary amines can also be used.

The base can also be degassed beforehand by bubbling with an inert gas.

To perform the reaction of the second step of the process, the bringing into contact can be carried out in any order of introducing the reactants. However, it is preferable to introduce the solution into a medium containing the base.

The second step must be carried out under an inert atmosphere, notably either in a closed reactor or in a semi-closed reactor with sweeping with the inert gas. The bringing into contact is generally carried out in a stirred reactor.

Finally, this second step is generally carried out at a temperature comprised between 5 and 50° C.

The third step (c) of the process is a thermal treatment of the reaction medium obtained at the end of the preceding step. This treatment consists in heating the medium and in maintaining it at a temperature which is generally comprised between 30 and 95° C., and more particularly between 60 and 95° C. The duration of this treatment can be between 10 minutes and 10 hours.

During step (c) oxidation of cerous ions from cerium(III) salt to ceric ions takes place, thereby forming a product comprising cerium(IV) oxide.

This treatment must be also carried out under an inert atmosphere, the description with respect to this atmosphere for the second step being applied similarly here. Similarly the treatment may be carried out in a stirred reactor.

According to one characteristic of the process of the invention, at least one of steps (a), (b) or (c) should be carried out in the presence of nitrate ions ($NO_3^-$). In general, the nitrate ions may be provided by any source or material that includes $NO_3^-$ anions such as $Ce(NO_3)_3$ or nitric acid ($HNO_3$) by way of example. Preferably nitric acid is added in step (a) during the preparation of the solution.

The amount of nitrate ions, expressed by the $NO_3^-/Ce^{3+}$ molar ratio, is generally between 1/3 and 5/1, preferably during step (a) or (b) or at the start of step (c).

A composition according to the invention may be obtained at the end of step (c).

Process of the present invention may optionally comprise at least one of the following step, notably at the end of step (c):

(d) acidifying and washing the product obtained in a preceding step, notably after the end of step (c), and/or (e) calcining the product obtained in a preceding step, notably after the end of step (c) or (d).

Step (d) may comprise two successive operations which can be carried out in any order. These operations may be, firstly, an acidification and, secondly, a wash. These operations will be described more specifically below, for the case of a series in which acidification is followed by washing.

The acidification is generally carried out, after cooling of the product obtained at the end of step (c), by the addition of an acid. Any inorganic or organic acid can be used. Nitric acid is more particularly used. The amount of acid added is such that the pH of the medium after acidification is comprised between 2 and 5.

The process of the invention preferably comprises then a step (d) of acidifying the product thus obtained to a pH comprised between 2 and 5, notably for a time comprised between 1 min and 100 min, preferably between 5 minutes and 60 minutes, and washing the medium thus obtained.

This operation can be carried out under air; it is usually no longer necessary to perform the procedure under an inert atmosphere at this stage of the process.

The acidification may be followed by washing, the aim of which is to remove from the suspension the soluble species, essentially salts. The washing can be carried out in various ways with or without solid/liquid separation. It can thus be carried out by separating the solid particles from the liquid phase, for example by frontal filtration, settling out or centrifugation. The solid obtained is then resuspended in an aqueous phase. The process can also be carried out by tangential filtration. This washing can be optionally repeated if necessary, for example until a given conductivity of the suspension is obtained, whereby the conductivity measures the amount of impurities present in this suspension.

As indicated above, the order of the operations can be reversed compared with that which has just been described. Thus, at the end of step (c), and, here again, generally after cooling of the medium obtained, washing can then carried out in the manner described above. At the end of the washing, the acidification of the medium obtained may be then carried out.

A composition according to the invention may be obtained at the end of step (d).

It's also possible after step (c) or after step (d) to proceed with a filtration in order to obtain a filter cake. The filter cake can be dried and/or calcined according to standard methods used in the prior art. The resulting dried and/or calcinated products may also be ground if necessary, notably for the catalyst application.

Step (e) concerns calcining of the product thus obtained in a preceding step, notably at the end of step (c) or (d). A drying made be carried out before the calcination. Said calcination may be carried out at a temperature comprised between 300 and 1200° C., over a period which can range between a few minute and a few hours.

At the end of the steps which have been described, it is possible to treat the composition which has been obtained in a known deagglomeration apparatus such as an apparatus of ultrasonic treatment, of double impact jet treatment or a wet milling apparatus.

The present invention also concerns a composition comprising a cerium oxide and a metal (M) oxide, other than cerium oxide, wherein metal (M) oxide/cerium oxide molar ratio is comprised between 0.1 and 15%; said composition exhibits:

a specific surface area, after calcination at 300° C. for 4 hours, comprised between 20 and 100 $m^2/g$, and a decrease ratio of specific surface area, after calcination at 800° C. for 4 hours, comprised between 1 and 60%, preferably comprised between 1 and 40%, more preferably comprised between 1 and 35%.

The composition of the invention as previously defined may notably be obtained by the process as described above, comprising the following steps (a), (b), (c) and optionally (d) and/or optionally (e) as defined.

The mixed oxides of the present invention may notably have a cubic crystal lattice structure.

The average size D50 of the primary particles (crystallites) of the mixed oxides of the invention may be comprised between 10 and 60 nm, preferably between 15 and 60 nm, more preferably between 15 and 40 nm. The average value of the size of the primary particles may be determined by the X-ray diffraction (XRD) technique. The value measured by XRD corresponds to the size of the coherent range calculated based on the breadth of the two most intense diffraction lines and using the Scherrer model.

These primary particles may be fine and monodisperse. They may provide an average size D50 with a standard deviation of at most 30% of the value of said average size. The standard deviation has the usual mathematical meaning, it is the square root of the variance and is notably expressed in the US application US2010/072417 A1.

Thus the standard deviation is the square root of the variance and it is expressed by the formula:

$$\sigma = \sqrt{\frac{1}{n}\sum_{i=1}^{n}(x_i - \bar{x})^2}$$

n being the number of particles taken into account in the measurement, $x_i$ being the size of a particle i, $\bar{x}$ being the average value of the size of the particles ($1/n\ \Sigma_i x_i$).

The size of the n various particles (n>300) is measured using a photograph obtained by transmission electron microscopy (TEM). This standard deviation can be preferably of at most 20%, more particularly at most 15%, and even more particularly at most 10% of the value of the average size D50 of the primary particles.

Secondary particles are aggregates made from other, finer particles called primary particles or crystallites. The secondary particle size D50 of the mixed oxides of the invention is preferably comprised between 0.05 and 30 μm, preferably between 0.1 and 20 μm. The size of the secondary particles may be measured by using a Horiba LA920 laser particle sizer, taking a value of 1.2 for the optical index of $CeO_2$ in sodium hexametaphosphate aqueous solution (distribution in volume).

Metal (M) oxide/cerium(IV) oxide molar ratio is comprised between 0.1 and 15%, preferably comprised between 0.5 and 10%, more preferably comprised between 1 and 7%.

According to one embodiment of the invention, metal (M) may be chosen in the group consisting of: rare earth elements and alkaline earth metal elements, said metal (M) having a higher ionic radius value than cerium, such as for example La, Pr, Nd, Y and Sr. Ionic radius values of these elements are mentioned in the following table:

| Element | Valence of ion | Coordination number | Ionic radius [Å] |
|---|---|---|---|
| Ce | 4+ | 8 | 0.97 |
| La | 3+ | 8 | 1.16 |
| Pr | 3+ | 8 | 1.126 |
| Nd | 3+ | 8 | 1.109 |
| Sr | 2+ | 8 | 1.26 |
| Y | 3+ | 8 | 1.019 |

The present invention concerns notably a composition comprising a cerium oxide and a metal (M) oxide wherein:
metal (M) is chosen in the group consisting of: rare earth element and alkaline earth metal elements; said metal having a higher ionic radius value than cerium, and
metal (M) oxide/cerium oxide molar ratio is comprised between 0.1 and 15%.
Said composition may exhibit:
a specific surface area, after calcination at 300° C. for 4 hours, comprised between 20 and 80 m²/g, and
a decrease ratio of specific surface area, after calcination at 800° C. for 4 hours, comprised between 1 and 35%.

Said compositions may provide secondary particles having a particle size D50 comprised between 0.05 and 2 μm, preferably comprised between 0.1 and 1 μm.

According to one embodiment of the invention, metal (M) forming the mixed oxide of the present invention may be chosen in the group consisting of: transition metal elements and post transition metal elements, said metal (M) having a lower ionic radius value than cerium, such as for example Al and Zr. Ionic radius values of these elements are mentioned in the following table:

| Element | Valence of ion | Coordination number | Ionic radius [Å] |
|---|---|---|---|
| Ce | 4+ | 8 | 0.97 |
| Al | 3+ | 6 | 0.535 |
| Zr | 4+ | 8 | 0.840 |

The present invention concerns then a composition comprising a cerium oxide and a metal (M) oxide wherein:
metal (M) is selected from the group consisting of: transition metal elements or post transition metal elements, said metal having a lower ionic radius value than cerium, and
metal (M) oxide/cerium oxide molar ratio is comprised between 0.1 and 15%.
Said composition may exhibit:
a specific surface area, after calcination at 300° C. for 4 hours, comprised between 60 and 100 m²/g, and
a decrease ratio of specific surface area, after calcination at 800° C. for 4 hours, comprised between 1 and 60%, preferably comprised between 1 and 50%.

Said compositions may provide secondary particles having a particle size D50 comprised between 1 and 30 μm, preferably comprised between 5 and 20 μm.

The present invention also concerns a suspension comprising at least the composition obtained according to the process as defined above or the composition as defined above and a liquid phase. The liquid phase of the suspensions according to the invention may be of various nature, such as water and/or an organic liquid, such as an organic solvent.

It can first of all be water. It can also be a water/water-miscible solvent mixture. As an example of a solvent of this type, mention may be made of alcohols such as methanol or ethanol, glycols such as ethylene glycol, acetate derivatives of glycols, such as ethylene glycol monoacetate, or polyols.

The liquid phase may also consist of an organic liquid, such as an organic solvent. As an example of an organic liquid, mention may be made of aliphatic hydrocarbons such as hexane, heptane, octane or nonane, inert cycloaliphatic hydrocarbons such as cyclohexane, cyclopentane or cycloheptane, aromatic hydrocarbons such as benzene, toluene, ethylbenzene, xylenes, or liquid naphthenes. Also suitable are petroleum fractions of the Isopar or Solvesso type (Trade Marks registered by the company Exxon), in particular Solvesso 100 which contains essentially a mixture of methylethylbenzene and trimethylbenzene, Solvesso 150 which contains a mixture of alkylbenzenes, in particular of dimethylbenzene and of tetramethylbenzene, and Isopar which contains essentially $C_{11}$ and $C_{12}$ isoparaffinic and cycloparaffinic hydrocarbons. Other types of petroleum fractions that may also be mentioned include those of Petrolink® type from the company Petrolink or of Isane® type from the company Total.

Chlorinated hydrocarbons, such as chlorobenzene, dichlorobenzene or chlorotoluene, can also be used as organic liquid. Aliphatic and cycloaliphatic ethers or ketones, for instance diisopropyl ether, dibutyl ether, methyl ethyl ketone, methyl isobutyl ketone, diisobutyl ketone or mesityl oxide, can be envisaged.

Esters can be used, such as those derived from the reaction of acids with $C_1$-$C_8$ alcohols, and in particular palmitates of secondary alcohols such as isopropanol. By way of example, mention may be made of butyl acetate.

The liquid phase can be based on a mixture of two or more hydrocarbons or compounds of the type described above.

The suspension may have an overall oxide content, i.e. cerium oxide and metal (M) oxide content, which can vary within wide limits and which can, for example, be comprised between 1 and 40% by mass of oxide, in particular between 5% and 30% by mass of oxide. Liquid phase usually represents the complement to 100% by weight of the suspension.

Similarly, the pH of these suspensions can be within a broad range, generally between 2 and 9, more particularly between 2 and 8, the suspensions remaining stable within the meaning given here below, within this pH range. The stability can be improved in a known manner, by addition to the suspension of compounds such as anionic or zwitterionic polymers or molecules. As compounds of this kind one can mention those compounds obtained by polymerizing at least one monomer chosen among the following: an ethylenically unsaturated, linear or branched, aliphatic, cyclic or aromatic monocarboxylic or polycarboxylic acid or anhydride. Polyacrylic acid or citric acid may be mentioned as examples.

It will be noted that the suspension of the invention are stable. This is intended to mean that no formation of a settling cake is observed on these suspensions before several days, for example at least 8 days. Furthermore, the settling cake, if it forms, can be resuspended by simple agitation.

In the case of a suspension partially or completely in an organic liquid medium other than water, this suspension can be prepared, in a manner known, from an aqueous suspension as obtained by means of the process which has just been described and by bringing into contact with the organic liquid.

It may be advantageous to add to the organic phase a promoter agent whose function is to accelerate the transfer of the particles from the aqueous phase to the organic phase and to improve the stability of the organic suspensions obtained.

As a promoter agent, use may be made of compounds comprising an alcohol function, and most particularly linear or branched aliphatic alcohols having from 6 to 12 carbon atoms. As specific examples, mention may be made of 2-ethylhexanol, decanol, dodecanol, or mixtures thereof.

The bringing into contact can be carried out at ambient temperature, for example approximately 20° C., but also at a higher temperature, for example in a range of from 60 to 150° C.

The separation between the aqueous and organic phases is carried out, for example, by distillation, by settling out or by centrifugation depending on the nature of the organic solvent.

The invention also relates to a redispersible powder of oxide particles. It is a characteristic of this powder that, after introduction into a liquid phase and redispersion in a liquid phase, it produces a suspension according to the invention as described above. The redispersion is carried out by simple agitation of the powder in the liquid phase. This powder can be obtained from a suspension according to the invention by drying and then calcination at a temperature which may be, for example, at most 300° C., and in particular between 100 and 200° C., over a period which can range between a few minutes and a few hours. This drying may be made by using a furnace, an oven or a spray dryer.

According to an embodiment of the invention, the invention also relates to a suspension for polishing, comprising either a suspension as described above, or a suspension as obtained by means of the processes described above, or else a suspension obtained after redispersion of a powder according to the invention. This suspension can be used for polishing glass, for example in the crystal-making or mirror industry, flat glass, television screens or spectacles, or else for polishing ceramics or other materials of vitreous type. This suspension can also be used most particularly for CMP-type polishing in the electronics industry and therefore for polishing metal substrates which go to make up microprocessors, but also for polishing insulating layers or Interlayer Dielectric (ILD) layers of these same microprocessors, the suspension of the invention being particularly suitable for the polishing of said layers. Chemical mechanical planarization (CMP) is a key process enabling Shallow Trench Isolation (STI), which is used in current integrated circuit manufacturing processes to achieve device isolation. These layers are generally made of silica, such as doped silica or porous silica. This suspension may also be used for metal CMP for wiring and barrier in integrated circuit, polishing a photomask substrate, notably made of a synthetic quartz glass.

In general, such suspensions comprise, in addition to the compound with abrasive property, such as the oxide particles of the invention, additives such as a dispersing agent or an oxidant.

The present invention also concerns a method of removing a portion of a substrate, notably in a CMP operation, comprising:
   contacting at least the suspension comprising the composition of the invention and the substrate to be polished, and
   performing the polishing on the substrate.

Preferably, the present invention concerns a method of removing a portion of a substrate, notably in a CMP operation, comprising:
   providing at least a suspension comprising the composition of the invention,
   contacting at least the suspension and the substrate to be polished, and
   performing the polishing on the substrate.

According to an embodiment of the present invention, the invention also concerns a catalytic system comprising at least the composition as described above. The catalytic system can comprise a coating (wash coat), based on these compositions and with catalytic properties, on a substrate of the metal or ceramic monolith type, for example. Such a monolith type can be a filter type based on silicon carbide, cordierite or aluminium titanate, for instance. The coating can itself also comprise a support of the type of those mentioned above. This coating is obtained by mixing the composition with the support, so as to form a suspension which can subsequently be deposited on the substrate.

These catalytic systems and more particularly the composition of the invention can have several applications. They are particularly well suited to, and thus usable in, the catalysis of various reactions, such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion, oxidation of CO, purification of air by low-temperature oxidation (<200° C., indeed even <100° C.), catalytic oxidation of the soot emitted by internal combustion engines, such as diesel engines or petrol engines operating under lean burn conditions.

In the case of these uses in catalysis, the composition of the invention can be employed in combination with precious metals. The nature of these metals and the techniques for the incorporation of the latter in these compositions are well known to a person skilled in the art. For example, the metals can be platinum, rhodium, palladium, gold or iridium and they can, in particular, be incorporated in the compositions by impregnation.

Among the uses mentioned, the treatment of exhaust gases from internal combustion engines (automobile afterburning catalysis) is a particularly advantageous application.

For this reason, the invention also relates to a process for the treatment of exhaust gases from internal combustion engines which is characterized in that use is made of a catalytic system as described above.

Another advantageous use is the purification of air at temperatures of less than 200° C., indeed even of less than 100° C., this air comprising at least one compound of the carbon monoxide, ethylene, aldehyde, amine, mercaptan or ozone type and generally of the type of the volatile organic compounds or atmospheric pollutants, such as fatty acids, hydrocarbons, in particular aromatic hydrocarbons, and nitrogen oxides (for the oxidation of NO to give $NO_2$), and of the malodorous compounds type.

The present invention also concerns then a process for the purification of air, said air notably comprising carbon monoxide, ethylene, aldehyde, amine, mercaptan, ozone, volatile organic compounds, atmospheric pollutants, fatty acids, hydrocarbons, aromatic hydrocarbons, nitrogen oxides or malodorous compounds, comprising the step of bringing into contact gases with the catalytic system of the invention. Mention may more particularly be made, as compounds of this type, of ethanethiol, valeric acid and trimethylamine. This treatment is carried out by bringing the air to be treated into contact with the composition of the invention or a catalytic system as described above or obtained by the processes described in detail above.

The following examples are included to illustrate embodiments of the invention. Needless to say, the invention is not limited to described examples.

EXPERIMENTAL PART

Comparative Example 1: Ce Oxide Composition

A dilute solution of cerium nitrate is prepared by adding 137.7 g of a 2.89 M trivalent cerium nitrate solution (39.9 g of cerium in terms of $CeO_2$), 24.4 g of 60% nitric acid and 0.32 g of 1.49 M cerium nitrate solution containing 92.8 mol % tetravalent cerium ions (0.057 g of cerium in terms of $CeO_2$). This solution, which has a cerium (III)/cerium(IV) molar ratio of 750, is loaded into a semi-closed reservoir and then degassed with vigorous agitation and with nitrogen bubbling for 1 hour.

A dilute solution of aqueous ammonia is prepared by adding 798.6 g of deionized water and a solution of 93.0 g of 25% aqueous ammonia. This solution is loaded into a semi-closed 1.5 l jacketed reactor and then subjected to agitation (stirrer with three inclined paddles at 500 rpm) and nitrogen bubbling for 1 hour.

The dilute cerium nitrate solution is then added, at ambient temperature, to the dilute aqueous ammonia solution over 30 minutes, with the same agitation and under nitrogen sweeping.

The nitrogen sweeping is stopped, and then the temperature of the reaction mixture is increased to 80° C. in approximately ¾ hours and then maintained at this temperature for 4 hours, still with the same agitation.

At the end of this heat treatment, the reaction mixture is left to cool and is then acidified to pH 2 by adding 60% nitric acid. The suspension is finally washed by centrifugation, elimination of the centrifugation water and resuspension of the cake in deionized water.

The suspension is subjected to solid-liquid separation through a Nutsche filter to obtain a filter cake.

The cake thus obtained is dried at 200° C. for 10 hours, and then calcined in the air at 300° C. for 4 hours followed by ground to obtain a cerium oxide powder.

The obtained oxide powder is observed by TEM. It is clearly observed that the primary particles are indeed monodisperse and of a size centered around 45 nm. On a photograph of approximately 150 particles representative of the oxide powder, each of the particles is counted and measured, by virtue of which an average size of 43 nm is obtained, with a standard deviation of 5.2 nm that is 12% of the value of the average size.

The oxide powder is measured by XRD analysis. The X-ray diffractogram of this powder has the signature of crystalline $CeO_2$ (sheet ASTM 34-394). The average size of the zone of coherence calculated from the mid-height width of the diffraction peaks located at $2\theta=28.6°$, by application of the Scherrer model, gives 48 nm. The BET specific surface area determined by nitrogen adsorption is 26 $m^2/g$.

The size of the secondary particles is measured using a Horiba LA920 laser particle sizer, taking a value of 1.2 for the optical index of $CeO_2$ in sodium hexametaphosphate aqueous solution. The median size D50 is 0.2 µm.

Comparative Example 2: Ce Oxide Composition 50 g of a ceric nitrate solution in terms of $CeO_2$ containing not less than 90 mol % of tetravalent cerium ions is measured out, and adjusted to a total amount of 1 l with deionized water. The obtained solution is heated to 100° C. under agitation, maintained at this temperature for 30 minutes, and allowed to cool down to the ambient temperature, to thereby obtain a cerium suspension.

After the mother liquor is removed (2.6 g of cerium in terms of $CeO_2$ is removed at the same time) from the cerium suspension thus obtained, the total volume is adjusted to 1 l with deionized water.

Then the cerium suspension is maintained at 120° C. for 2 hours under agitation, allowed to cool, and neutralized to pH 8.5 with 25% aqueous ammonia.

The obtained slurry is subjected to solid-liquid separation through a Nutsche filter to obtain a filter cake. The cake is calcined in the air at 300° C. for 4 hours to obtain cerium oxide powder.

The oxide powder is measured by XRD analysis in the same way as in Comparative Example 1. The crystallite size calculated by (111) face is 9 nm. The BET specific surface area determined by nitrogen adsorption is 180 $m^2/g$.

The size of the secondary particles is measured in the same way as in Comparative Example 1. The median size d50 is 8.6 µm.

Comparative Example 3: Ce Oxide/Metal (M) Oxide Composition

C3.1 Ce Oxide/La Oxide Composition

A composite oxide of cerium oxide and lanthanum oxide at a mass ratio of 95:5 (metal (M) oxide/cerium(IV) oxide molar ratio of 5.6%) is prepared in the same way as in Comparative Example 2 except that 10.9 g of a lanthanum nitrate solution (2.5 g of lanthanum in terms of $La_2O_3$) is added after the mother liquor is removed.

The oxide powder is measured by XRD analysis in the same way as in Comparative Example 1. The crystallite size calculated by (111) face is 11 nm. The BET specific surface area determined by nitrogen adsorption is 225 $m^2/g$.

The size of the secondary particles is measured in the same way as in Comparative Example 1. The median size d50 is 7.1 µm.

C3.2 Ce Oxide/Pr Oxide Composition

A composite oxide of cerium oxide and praseodymium oxide at a mass ratio of 95:5 (metal (M) oxide/cerium(IV) oxide molar ratio of 5.3%) is prepared in the same way as in Comparative Example 2 except that 10.5 g of a praseodymium nitrate solution (2.5 g of praseodymium in terms of $Pr_6O_{11}$) is added after the mother liquor is removed.

The oxide powder is measured by XRD analysis in the same way as in Comparative Example 1. The crystallite size calculated by (111) face is 11 nm. The BET specific surface area determined by nitrogen adsorption is 245 m²/g.

The size of the secondary particles is measured in the same way as in Comparative Example 1. The median size d50 is 6.2 μm.

C3.3 Ce Oxide/Nd Oxide Composition

A composite oxide of cerium oxide and neodymium oxide at a mass ratio of 95:5 (metal (M) oxide/cerium(IV) oxide molar ratio of 5.3%) is prepared in the same way as in Comparative Example 2 except that 12.4 g of a neodymium nitrate solution (2.5 g of neodymium in terms of $Nd_2O_3$) is added after the mother liquor is removed.

The oxide powder is measured by XRD analysis in the same way as in Comparative Example 1. The crystallite size calculated by (111) face is 12 nm. The BET specific surface area determined by nitrogen adsorption is 196 m²/g.

The size of the secondary particles is measured in the same way as in Comparative Example 1. The median size d50 is 3.6 μm.

C3.4 Ce Oxide/Zr Oxide Composition

A composite oxide of cerium oxide and zirconium oxide at a mass ratio of 90:10 (metal (M) oxide/cerium(IV) oxide molar ratio of 15.4%) is prepared in the same way as in Comparative Example 2 except that 26.7 g of a zirconium nitrate solution (5.3 g of zirconium in terms of $ZrO_2$) is added after the mother liquor is removed.

The oxide powder is measured by XRD analysis in the same way as in Comparative Example 1. The crystallite size calculated by (111) face is 16 nm. The BET specific surface area determined by nitrogen adsorption is 152 m²/g.

The size of the secondary particles is measured in the same way as in Comparative Example 1. The median size d50 is 17.2 μm.

Example 1: Ce Oxide/Metal (M) Oxide Composition

1.1 Ce Oxide/La Oxide Composition

This example relates to a composite oxide of cerium oxide and lanthanum oxide at a mass ratio of 95:5 (metal (M) oxide/cerium(IV) oxide molar ratio of 5.6%).

A dilute solution of cerium nitrate is prepared by adding 130.5 g of a 2.89 M trivalent cerium nitrate solution (39.9 g of cerium in terms of $CeO_2$), 12.1 g of lanthanum nitrate solution (2.0 g of lanthanum in terms of $La_2O_3$), 23.1 g of 60% nitric acid and 0.92 g of 1.49 M cerium nitrate solution containing 92.8 mol % tetravalent cerium ions (0.16 g of cerium in terms of $CeO_2$). This solution, which has a cerium(III)/cerium(IV) molar ratio of 250, is loaded into a semi-closed reservoir and then degassed with vigorous agitation and with nitrogen bubbling for 1 hour.

A dilute solution of aqueous ammonia is prepared by adding 794.2 g of deionized water and a solution of 93.2 g of 25% aqueous ammonia. This solution is loaded into a semi-closed 1.5 l jacketed reactor and then subjected to agitation (stirrer with four inclined paddles at 500 rpm) and nitrogen bubbling for 1 hour.

The dilute cerium nitrate solution is then added, at ambient temperature, to the dilute aqueous ammonia solution over 30 minutes, with the same agitation and under nitrogen sweeping.

The nitrogen sweeping is stopped, and then the temperature of the reaction mixture is increased to 80° C. in approximately ¾ hours and then maintained at this temperature for 4 hours, still with the same agitation.

At the end of this heat treatment, the reaction mixture is left to cool and is then acidified to pH 2 by adding 60% nitric acid. The suspension is finally washed by centrifugation, elimination of the centrifugation water and resuspension of the cake in deionized water.

The suspension is subjected to solid-liquid separation through a Nutsche filter to obtain a filter cake.

The cake thus obtained is dried at 200° C. for 10 hours, and then calcined in the air at 300° C. for 4 hours followed by ground to obtain a cerium oxide powder.

The obtained oxide powder is observed by TEM. It is clearly observed that the primary particles are indeed monodisperse and of a size centered around 35 nm. On a photograph of approximately 150 particles representative of the oxide powder, each of the particles is counted and measured, by virtue of which an average size of 34 nm is obtained, with a standard deviation of 3.3 nm that is 10% of the value of the average size.

The oxide powder is measured by XRD analysis in the same way as in Comparative Example 1. The crystallite size calculated by (111) face is 24 nm. The BET specific surface area determined by nitrogen adsorption is 59 m²/g.

The size of the secondary particles is measured in the same way as in Comparative Example 1. The median size d50 is 0.1 μm.

1.2 Ce Oxide/Pr Oxide Composition

A composite oxide of cerium oxide and praseodymium oxide at a mass ratio of 95:5 (metal (M) oxide/cerium(IV) oxide molar ratio of 5.3%) is prepared in the same way as in Example 1.1 except that 10.1 g of a praseodymium nitrate solution (2.0 g of praseodymium in terms of $Pr_6O_{11}$) is added instead of lanthanum nitrate solution.

The oxide powder is measured by XRD analysis in the same way as in Comparative Example 1. The crystallite size calculated by (111) face is 26 nm. The BET specific surface area determined by nitrogen adsorption is 57 m²/g.

The size of the secondary particles is measured in the same way as in Comparative Example 1. The median size d50 is 0.2 μm.

1.3 Ce Oxide/Nd Oxide Composition

A composite oxide of cerium oxide and neodymium oxide at a mass ratio of 95:5 (metal (M) oxide/cerium(IV) oxide molar ratio of 5.3%) is prepared in the same way as in Example 1.1 except that 9.9 g of a neodymium nitrate solution (2.0 g of neodymium in terms of $Nd_2O_3$) is added instead of lanthanum nitrate solution.

The oxide powder is measured by XRD analysis in the same way as in Comparative Example 1. The crystallite size calculated by (111) face is 22 nm. The BET specific surface area determined by nitrogen adsorption is 50 m²/g.

The size of the secondary particles is measured in the same way as in Comparative Example 1. The median size d50 is 0.3 μm.

1.4 Ce Oxide/Zr Oxide Composition

A composite oxide of cerium oxide and zirconium oxide at a mass ratio of 98.5:1.5 (metal (M) oxide/cerium(IV) oxide molar ratio of 2.1%) is prepared in the same way as in Example 1.1 except that 10.1 g of an zirconium nitrate solution (2.0 g of zirconium in terms of $ZrO_2$) is added instead of lanthanum nitrate solution, and the quantity of 1.49 M cerium nitrate solution containing 92.8 mol % tetravalent cerium ions is changed from 0.92 g to 2.3 g (0.4 g of cerium in terms of $CeO_2$) for agreement of cerium(III)/cerium(IV) molar ratio of 100.

The oxide powder is measured by XRD analysis in the same way as in Comparative Example 1. The crystallite size calculated by (111) face is 19 nm. The BET specific surface area determined by nitrogen adsorption is 74 $m^2/g$.

The size of the secondary particles is measured in the same way as in Comparative Example 1. The median size d50 is 17 μm.

Example 2: Thermal Stability Comparisons

Compositions obtained in the above examples were tested for their thermal stability after calcination at 300° C. for 4 hours then 800° C. for 4 hours as well. Results are expressed in Table 1.

TABLE 1

| Compositions | SBET 300° C./4 h ($m^2/g$) | SBET 800° C./4 h ($m^2/g$) | SBET Decrease ratio (%) | Thermal stability | SBET Variation (%) |
|---|---|---|---|---|---|
| C2: Ce | 180 | 67 | 63 | No | 0 |
| C3.1: Ce/La | 225 | 59 | 74 | No | −11 |
| C3.2: Ce/Pr | 245 | 59 | 76 | No | −11 |
| C3.3: Ce/Nd | 196 | 55 | 72 | No | −18 |
| C3.4: Ce/Zr | 152 | 44 | 71 | No | −34 |
| C1: Ce | 26 | 19 | 27 | Yes | 0 |
| 1.1: Ce/La | 59 | 41 | 30 | Yes | +116 |
| 1.2: Ce/Pr | 57 | 51 | 10 | Yes | +168 |
| 1.3: Ce/Nd | 50 | 37 | 26 | Yes | +95 |
| 1.4: Ce/Zr | 74 | 48 | 35 | Yes | +152 |

SBET decrease ratio: percent of decrease ratio of SBET after calcination at 800° C./4 h in comparison with calcination at 300° C./4 h, for an oxide composition SBET variation: percent of variation of SBET after calcination at 800° C./4 h in comparison with SBET of pure cerium oxide composition; thus SBET variation for a composition=(SBET at 800° C./4 h of the composition—SBET at 800° C./4 h of pure $CeO_2$)/SBET at 800° C./4 h of pure $CeO_2 \times 100$; wherein SBET at 800° C./4 h of pure $CeO_2$ is the specific surface of pure CeO2 after calcination at 800° C. for 4 hours, the pure $CeO_2$ being obtained with the same process as the composition (except there is no salt of metal M).

It appears then from the previous results that dopants such as La, Pr, Nd and Zr on classical cerium oxide compounds (C3.1-C3.4) lead to a decrease of specific surface areas after a thermal treatment, in comparison with pure cerium (C2) after same thermal treatment; see SBET variation column. By contrast, doped cerium compounds of the instant invention with La, Pr, Nd and Zr (1.1-1.4) have higher specific surface areas after a thermal treatment, in comparison with pure cerium (C1) after same thermal treatment.

Moreover, doped cerium compounds of the instant invention with La, Pr, Nd and Zr (1.1-1.4) have a lower decrease ratio of specific surface areas after a thermal treatment in comparison with classical cerium oxide compounds doped by the same dopants (C3.1-C3.4) that shows a SBET decrease ratio higher than 70%.

The invention claimed is:

1. A process for preparing a composition comprising a cerium oxide and at least a metal (M) oxide wherein the metal (M) oxide/cerium oxide molar ratio is comprised between 0.1/100 and 15/100; and said composition exhibits:
    a specific surface area, after calcination at 300° C. for 4 hours, comprised between 20 and 100 $m^2/g$, and
    a decrease ratio of specific surface area, after calcination at 800° C. for 4 hours, comprised between 1 and 60%, the process comprising:
    contacting a solution comprising a cerium(III) salt, a cerium(IV) compound and a salt of metal (M) with a base, under an inert atmosphere, whereby a precipitate is obtained; wherein cerium(III) salt/cerium(IV) compound molar ratio is comprised between 75/1 and 500/1;
    subjecting the precipitate in solution to a thermal treatment under an inert atmosphere, whereby the composition is obtained, wherein metal (M) oxide/cerium(IV) oxide molar ratio of said composition is comprised between 0.1/100 and 15/100; and at least one of the contacting step or the subjecting step is carried out in the presence of nitrate ions.

2. The process according to claim 1, wherein said process further comprises acidifying and washing the product obtained in a preceding step.

3. The process according to claim 2, wherein the pH of the medium after acidification is comprised between 2 and 5.

4. The process according to claim 1, wherein said process further comprises calcining the composition.

5. The process according to claim 1, wherein metal (M) is selected from the group consisting of: Zr, Al, La, Pr, Nd, Y and Sr.

6. The process according to claim 1, wherein the metal (M) oxide/cerium oxide molar ratio is comprised between 1/100 and 7/100.

7. The process according to claim 1, wherein the composition exhibits:
    a specific surface area, after calcination at 300° C. for 4 hours, comprised between 20 and 80 $m^2/g$, and
    a decrease ratio of specific surface area, after calcination at 800° C. for 4 hours, comprised between 1 and 35%.

8. A composition comprising a cerium oxide and a metal (M) oxide, wherein the metal (M) oxide/cerium oxide molar ratio is comprised between 0.1/100 and 15/100; and
    said composition exhibits:
    a specific surface area, after calcination at 300° C. for 4 hours, comprised between 20 and 100 $m^2/g$, and
    a decrease ratio of specific surface area, after calcination at 800° C. for 4 hours, comprised between 1 and 60%, and
    wherein the composition comprises secondary particles made of primary particles comprising a cerium oxide and a metal (M) oxide, said primary particles having an average size D50 comprised between 10 and 60 nm with a standard deviation of at most 30% of the value of said average size.

9. The composition according to claim 8, wherein the average size D50 of the primary particles is comprised between 15 and 40 nm.

10. The composition according to claim 8, wherein the metal (M) is selected from the group consisting of: rare earth elements and alkaline earth metal elements, said metal (M) having a higher ionic radius value than cerium.

11. The composition according to claim 10, wherein said composition exhibits:
    a specific surface area, after calcination at 300° C. for 4 hours, comprised between 20 and 80 $m^2/g$, and
    a decrease ratio of specific surface area, after calcination at 800° C. for 4 hours, comprised between 1 and 35%.

12. The composition according to claim 8, wherein the metal (M) is selected from the group consisting of: transition metal elements and post transition metal elements, said metal (M) having a lower ionic radius value than cerium.

13. The composition according to claim 12, wherein said composition exhibits:
   a specific surface area, after calcination at 300° C. for 4 hours, comprised between 60 and 100 m²/g, and
   a decrease ratio of specific surface area, after calcination at 800° C. for 4 hours, comprised between 1 and 60%.

14. A suspension comprising the composition as defined in claim 8, and a liquid phase.

15. A method of removing a portion of a substrate, the method comprising:
   contacting at least a suspension according to claim 14 and the substrate to be polished, and
   performing the polishing on the substrate.

16. A method of removing a portion of a substrate, the method comprising:
   providing at least a suspension according to claim 14,
   contacting at least the suspension and the substrate to be polished, and
   performing the polishing on the substrate.

17. A catalytic system comprising at least a composition according to claim 8.

18. A process for the treatment of exhaust gases from internal combustion engines, the process comprising contacting the exhaust gases with a catalytic system according to claim 17.

19. A process for the purification of air, the process comprising contacting the air with the catalytic system according to claim 17.

20. The composition according to claim 8, wherein the metal (M) oxide/cerium oxide molar ratio is comprised between 1/100 and 7/100.

21. The composition according to claim 8, wherein said primary particles have an average size D50 with a standard deviation of at most 15% of the value of said average size.

22. The composition according to claim 8, wherein said primary particles have an average size D50 with a standard deviation of at most 10% of the value of said average size.

* * * * *